United States Patent [19]

Hunt et al.

[11] Patent Number: 5,675,882
[45] Date of Patent: Oct. 14, 1997

[54] REFUSE TIRE DEBEADER

[76] Inventors: James R. Hunt, 1800 Montreal Ct., Tucker, Ga. 30084; Jerry Lee Hunt, 25 Circle Dr., Rossville, Ga. 30741

[21] Appl. No.: 514,661

[22] Filed: Aug. 14, 1995

[51] Int. Cl.[6] .............................. B23P 17/00; B23P 19/04; B26D 7/27
[52] U.S. Cl. .................... 29/426.3; 29/426.4; 29/426.5; 29/712; 29/822
[58] Field of Search ............................ 29/403.1, 426.1, 29/426.3, 426.4, 426.5, 711, 712, 791, 822; 241/DIG. 31

[56] References Cited

U.S. PATENT DOCUMENTS

| | | | |
|---|---|---|---|
| 3,718,284 | 2/1973 | Richardson | 241/DIG. 31 X |
| 3,838,492 | 10/1974 | Uemura | 29/427 |
| 4,405,090 | 9/1983 | Wakeem | 241/DIG. 31 X |
| 4,714,201 | 12/1987 | Rouse et al. | 241/DIG. 31 X |
| 4,738,172 | 4/1988 | Barclay | 83/18 |
| 4,873,759 | 10/1989 | Burch | 29/700 |
| 5,147,163 | 9/1992 | Booker et al. | 409/199 |
| 5,299,748 | 4/1994 | Brewer | 241/279 |

FOREIGN PATENT DOCUMENTS 52-54778  5/1977  Japan ................ 41/DIG. 31

*Primary Examiner*—S. Thomas Hughes
*Attorney, Agent, or Firm*—John Lezdey

[57] ABSTRACT

The invention provides an apparatus for removing at least one bead from a tire. The apparatus includes a conveyor for tires and a sensor which centers the tire about a debeading device and a cutting device. The conveyor then moves the cut tire to a second position wherein the bead is pulled from the tire. A microprocessor is used to position the tires and for resetting the devices for treating additional tires.

12 Claims, 3 Drawing Sheets

REFUSE TIRE DEBEADER

The instant invention relates to the art of removing and/or extracting and/or withdrawing the bead wires from a refuse tire, for the purpose of rendering a refuse tire carcass suitable for further treatment on its course to being rendered into a crumb rubber product.

BACKGROUND OF THE INVENTION

U.S. Pat. No. 5,147,163 teaches an automatic apparatus for removing tread from beads of various sized tires. The automatic apparatus includes a tire centering device for vertically orienting the tire so that the radial center axis of the tire is positioned along a horizontal reference axis. The tire centering device includes a catch box having movable side walls and movable bottom plates to accomplish this centering. After the tire is centered, the tire is moved to a tire gripping device which grips the rim of the tire. Thereafter, a tire cutter device is moved in position to cut the tread from the bead of the tire as the tire is turned one revolution. Finally, a tire ejecting device is actuated to eject the remaining bead of the tire from the tire gripping device so that the cycle can be repeated.

U.S. Pat. No. 5,299,748 which teaches an apparatus for reducing extra large vehicle tires to particles or to prepare them for recapping comprises a tire holder assembly, made up of a set of dual jacks, in combination with a rotary cutter blade assembly made up of a side-by-side series of discs carrying cutter blades of chisel type. The set of dual jacks are preferably carried by an arbor having opposite shaft ends adapted to matingly interconnect with corresponding ends of a motivating shaft for quick and easy interchange of one size tire holder assembly for another size. When the tire is to be recapped, arcuate attachments are secured to members of the tire holder assembly that contact a tire bead so as to preserve the circumferential integrity of such bead during cutting, and the cutter blade assembly is replaced by wire buffing brushes following removal of the tread portion of the tire by cutting. An optional feature of the invention is the freezing of the tire prior to cutting, so that steel reinforcing materials as well as the elastomeric material of the tire can be easily reduced to particles.

U.S. Pat. No. 3,838,492 discloses a method and apparatus for removing a ring-shaped bead wire from a tire by drawing it through a die under compulsory force effected between the bead and the die, wherein the die opening is of a configuration to prevent surrounding tire rubber to be pulled through the die with the bead wire.

U.S. Pat. No. 4,738,172 shows an apparatus for removing the bead wires from a scrap tire having a pair of overlapping and counter-rotating shearing members and a movable carriage. The carriage includes a plurality of rolls positioned to fit within the inner diameter of a tire. One of these rolls is a tensioning roll that is movable so as to stretch the tire and elongate the bead wires. This elongation crowds the bead wires against the crowding bar. The crowding bar and a pair of compression rollers are mounted to a rod which is moved downwardly when the carriage is advanced toward the shearing members, the compression rollers are positioned to apply compression force to the side wall of the tire as the rollers descend. The compression force aligns the bead wires with a bead guide roll so that the crowding bar may be pivoted away from the subsequent shearing action, the bead wires are thus crowded against the bead guide roll. At the same time a spring biased lower compression roller is cammed upward to apply compression force to the lower side wall. The carriage is advanced until the shearing members have made a first tire shear that is at least tangential to the bead wire against the bead guide roll. When the pinch point of the shearing members is proximate the bead wires, forward movement of the carriage is stopped. However, the tire is caused to be rotated about its axis by the shearing members to produce a second shear that is substantially concentric with the bead wires. The first and second shears effected in a single continuous motion.

U.S. Pat. No. 4,873,759 shows a tire debeading machine.

Although the prior art offers a number of debeading devices of various designs; none offers the automated, continuous processing of up to one hundred (100) tires per hour while employing equipment having power requirements as little as thirty (30) to fifty (50) horsepower. Therefore, there exists a long felt need for such equipment.

Thus, it is the primary object of the instant invention to satisfy this long felt need.

It is also an object of the invention to provide an apparatus for quickly and efficiently debeading used tires.

SUMMARY OF THE INVENTION

The instant invention provides an apparatus, and a method for its use, for removing at least one bead from at least one tire. In its broadest expression, the apparatus includes: a structure for conveying the tire along a generally horizontal plane to a predetermined point lying on a generally straight path lying on the plane; a structure for stopping the tire when its center about coincides with the predetermined point relative to the longitudinal dimension of the path; a structure for centering the tire about a line which passes through the point and is substantially perpendicular to the plane; a structure for debeading the tire located at about the point, which further comprises: a structure for cutting the at least one bead at a first position on the tire; a structure for pulling the bead from the tire at a second position on the tire positioned at an angle of about one hundred and eighty degrees (180°) relative to the first position on the tire; and, a structure for controlling the structure for centering and at least one of the structure for positioning in response to the structure for stopping. Preferably, the structure for conveying includes an indexing conveyor having two separate conveyor belts which lie in the foregoing plane and are equidistant from the foregoing line and spaced from each other sufficient for enabling a structure for debeading to be pass through the open center of the tire after it has been centered by the centering structure. Preferably, the centering structure further includes pusher arms for pushing the tire to a centered position on the conveyor after the tire reaches the predetermined point. One of each of the pusher arms is positioned on each side of the conveyor, lying in a substantially straight line perpendicular to, and passing through the path of the tire. The pushing end of each of the pusher arms is pointed toward the tire.

Preferably, the stopping structure also includes an electric eye having a beam substantially perpendicular to the conveyor and lying in the path of the tire. It also preferably includes a switch for stopping the power feed to the conveyor in response to the disruption of the beam by the tire. The pushing structure also preferably includes a servo motor for driving each of the pusher arms. The debeading structure is located below the plane and centrally positioned about a line which passes through the forgoing predetermined point and the foregoing plane and is generally perpendicular to the foregoing plane. The cutting structure also preferably includes a circular saw. The pulling structure also preferably includes a die and a hook for pulling the bead through the die, after it has been cut by the circular saw. Preferably the structure for controlling includes structure for activating both servo motors in response to the disruption of the beam of the electric eye, and functions to drive each of the two push arms from an initial position to an extended position and for resetting each servo motor for enabling each pusher arm to be reset from its extended position to its initial position after the bead is removed from the tire; structure for positioning the cutting structure from an initial position to a bead cutting position; structure for causing the cutting structure to cut the bead; structure for resetting the cutting structure from a bead cutting position to an initial position after the bead has been removed from the tire; structure for positioning the pulling structure from an initial position to a bead pulling position and for enabling engagement of the bead by the pulling structure; and, structure for enabling pulling and resetting the structure for positioning from a bead pulling position to an initial pulling position. Preferably the structure for controlling includes a microprocessor.

Further objects and advantages will become more apparent from the following description and the accompanying drawings.

DETAILED DESCRIPTION OF THE INVENTION

Figure 1:
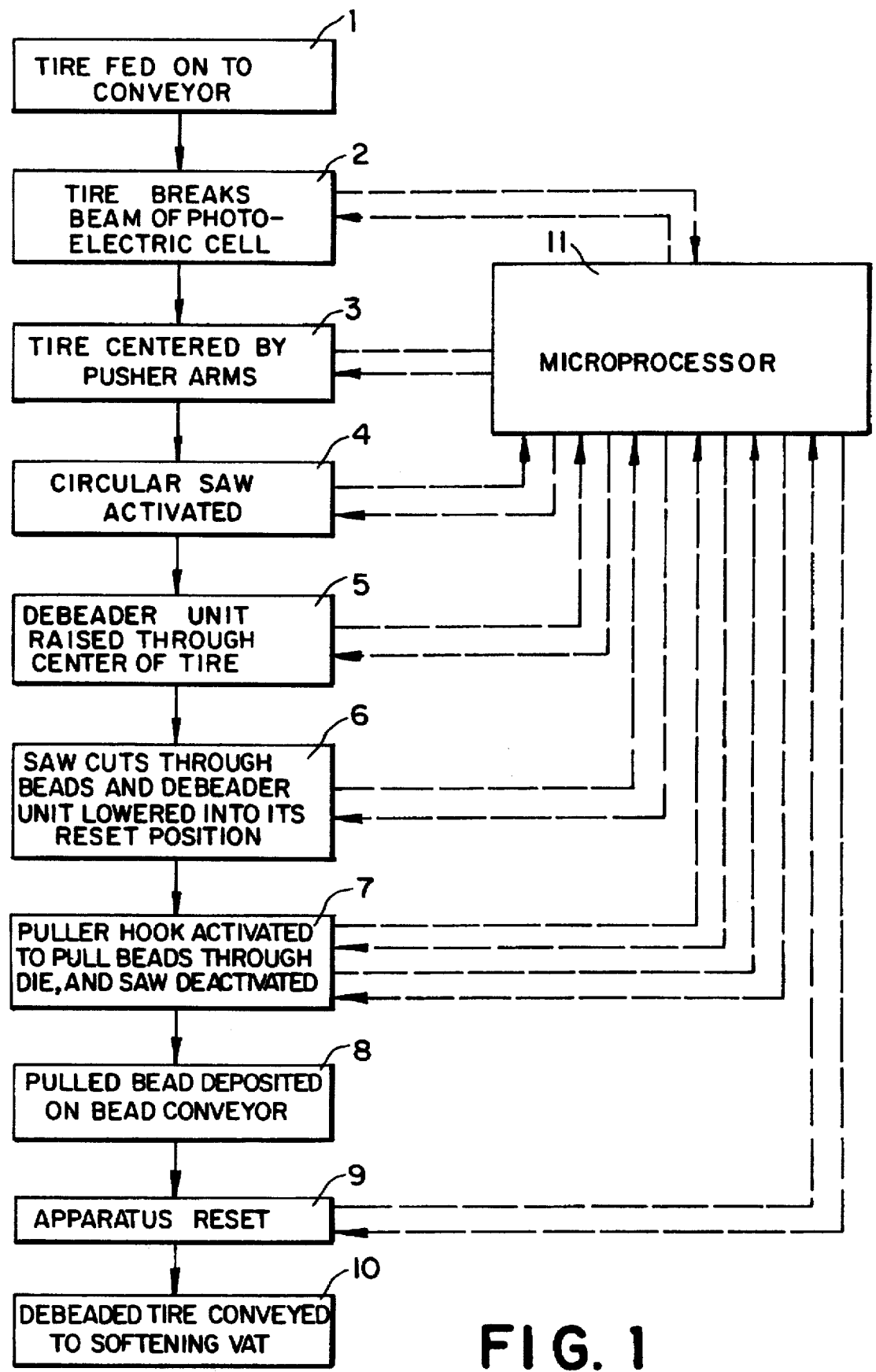
FIG. 1 is a block diagram showing the steps of the instant method and illustrates the manner in which they are sequentially programmed within the instant microprocessor.

FIG. 1 shows a block diagram showing the steps of the instant method and illustrates the manner in which they are sequentially programmed within the instant microprocessor 11. Step 1 comprises feeding a tire onto a conveyor. The tire travels on the conveyor until it breaks a beam of a photoelectric cell at step 2, thereby sending a signal to the microprocessor 11, which initiates the remaining sequence of steps. The breaking of the photoelectric beam causes the microprocessor 11 to interrupt the power to the conveyor, thereby stopping it. The microprocessor 11 thereupon activates pusher arms at step 3, which center the tire substantially precisely over a debeading structure, and thereafter activates a circular saw cutting component of the debeading structure at step 4. The microprocessor 11 thereupon causes the entire debeading unit to be raised to its highest point whereby the activated circular saw cuts through the beads in the inner circumferences of the tire at step 5. After the debeading unit has been raised to its highest level and the circular saw has cut through both beads of the tire, the debeading unit is caused to be lowered by the microprocessor 11 at step 6, thereby causing a hook element of the unit to hook the beads at the inner circumferences of the tire about one hundred and eighty degrees (180°) relative to where they had been cut. At step 7, the microprocessor 11 causes the circular saw to become deactivated and a puller structure to become activated, thereby pulling the cut beads from the tire through a die. At step 8, the pulled beads are deposited on a bead conveyor and conveyed to bead storage.

At step 9, the microprocessor 11 resets the entire apparatus to accept another beaded tire for the foregoing sequence, and the debeaded tire is conveyed to a tire softening vat so as to be later processed into crumb.

Figure 2:
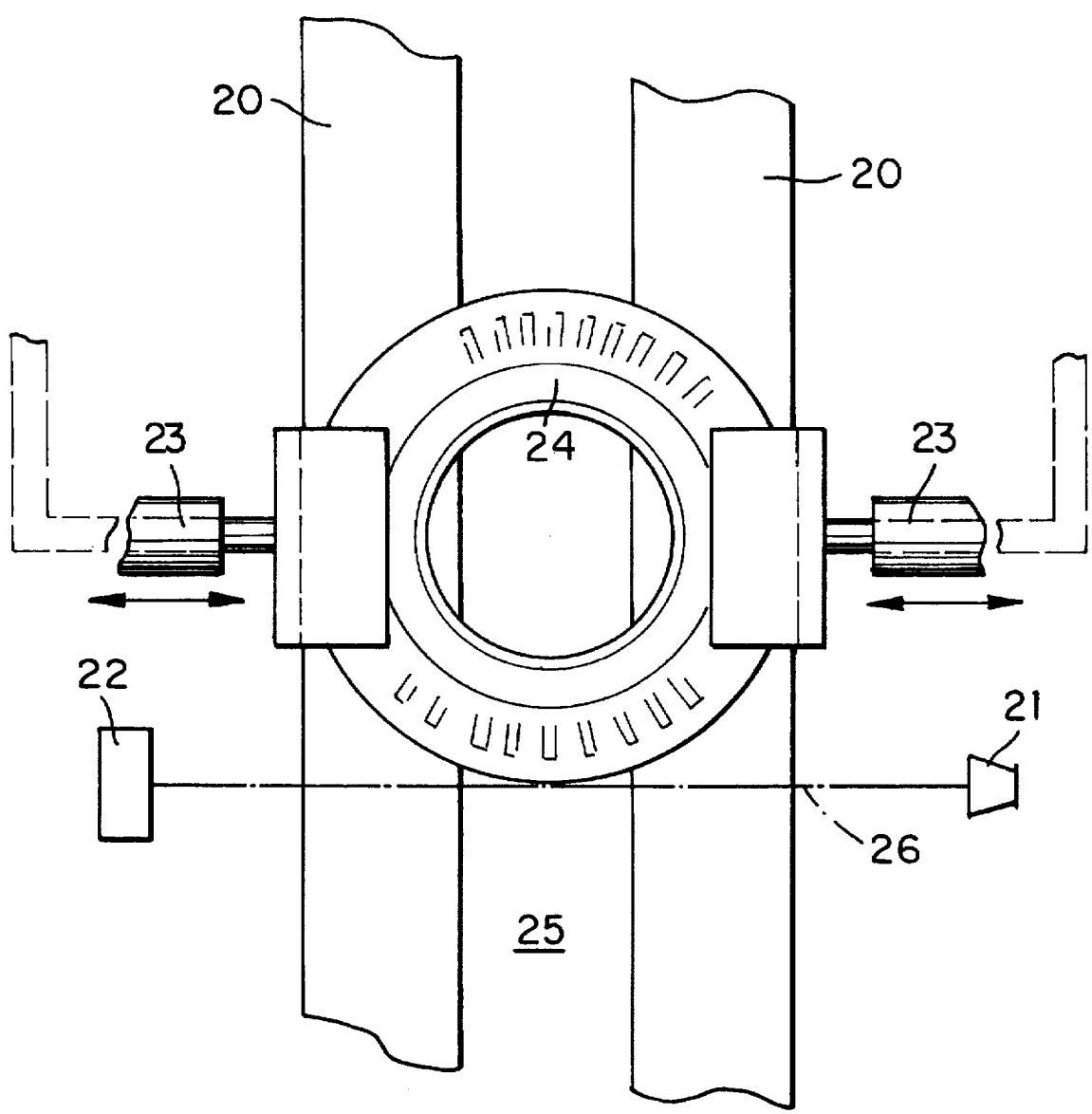
FIG. 2 shows a partial plan view of the preferred embodiment of instant apparatus depicting the photoelectric cell and pusher arms.

FIG. 2 shows a partial plan view of the preferred embodiment of instant apparatus depicting the photoelectric cell 21, 22, and pusher arms 23. Tire 24 is conveyed by the conveyor which comprises conveyor belts 20 separated by a space 25, to the point where the tire 24, first interrupts beam 26. Interruption of the beam 26, causes the microprocessor (not shown) to interrupt the power feed to the conveyor (not shown), thereby stopping it. The microprocessor is next programmed to activate pusher arms 23 to engage and center tire 24 substantially precisely over the predetermined point which defines the center of the debeading device (not shown).

Figure 3:
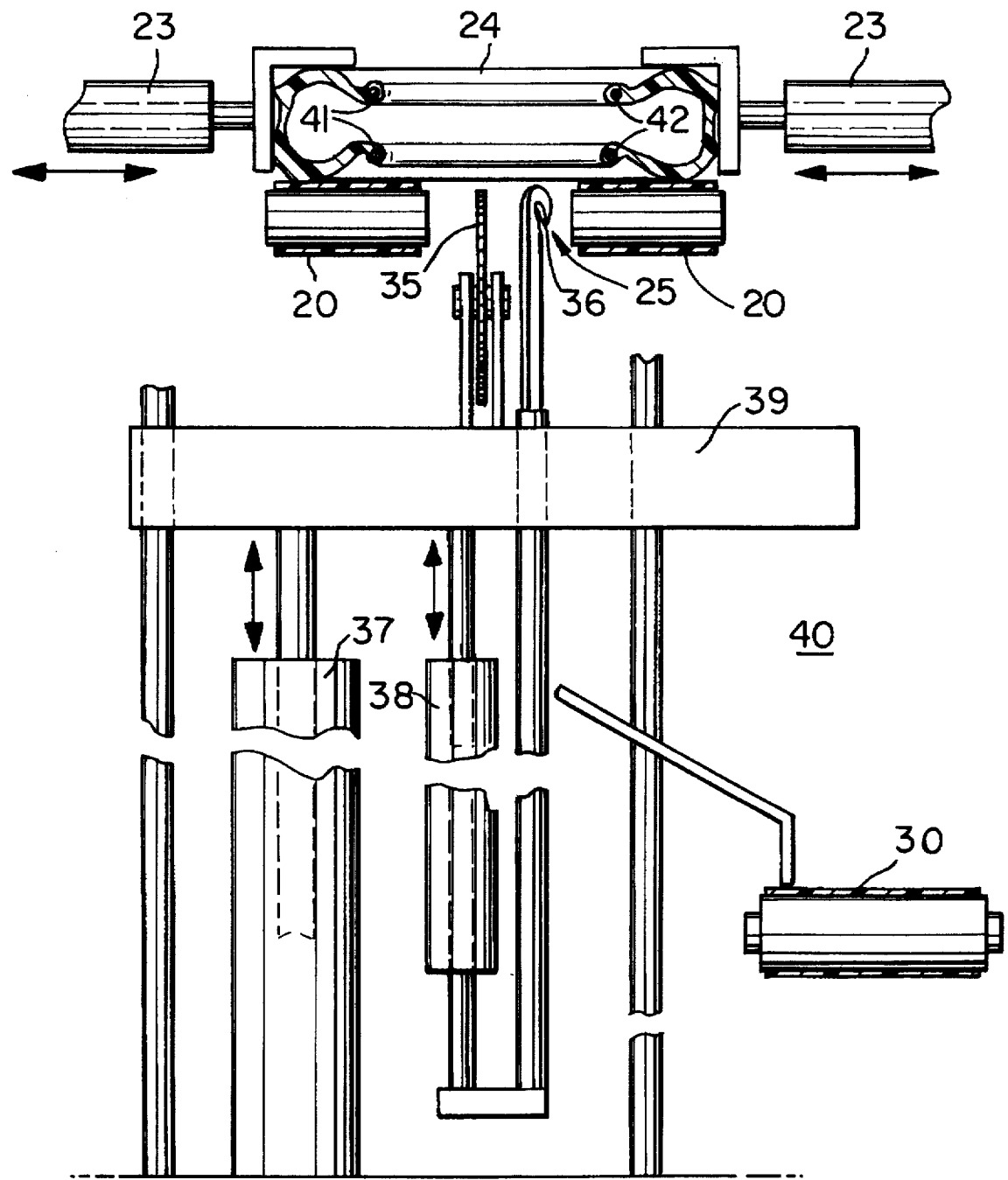
FIG. 3 shows a front partial cutaway elevation view of the preferred embodiment of instant apparatus depicting a partial cutaway elevation view of the conveyor and an elevation view of the debeading device.

FIG. 3 shows a front partial cutaway elevation view of the preferred embodiment of instant apparatus depicting a partial cutaway elevation view of the conveyor, and an elevation view of the debeading device. After tire 24 (cross-sectional cutaway view shown) is centered on the conveyor comprising separate conveyor belts 30 (cross-sectional cutaway view shown), power is fed to circular saw 35, and debeading unit 40, comprising circular saw 35 and hook element 36, is raised by the debeader unit elevator 37 sufficient to enable circular saw 35, to cut through beads 41, and to enable hook element 36 to rise above the level of beads 42. Debeading unit 40 is thereafter lowered by debeader unit elevator 37, to its reset position; the power feed to circular saw 35 is then interrupted; and power is fed to hook element elevator 38 so as to enable the hook element 36 to be lowered to engage beads 42 (which have been cut at 41) and pull them through die 39 comprising spaced rollers where they are thereafter deposited on a magnetic bead conveyor 30. The rollers are spaced about one inch apart. The entire foregoing sequence is has been programmed into and executed by the microprocessor.

Although the invention has been described with reference to a certain preferred embodiment, it will be appreciated that many variations and modifications may be made within the scope of the broad principles of the invention. Hence, it is intended that the preferred embodiments and all of such variations and modifications be included within the scope and spirit of the invention, as defined by the following claims.

What is claimed is:

1. An apparatus for removing at least one bead from a tire, comprising:

means for conveying said tire along a generally horizontal plane to a predetermined point lying on a generally straight path lying on said plane;

means for sensing and stopping said tire when the center of said tire coincides with said predetermined point relative to the longitudinal dimension of said path;

means for centering said tire about a line which passes through said point and is substantially perpendicular to said plane;

means for debeading said tire located at about said point, said means for debeading comprising means for cutting said at least one bead at a first position on said tire, and means for pulling said bead from said tire at a second position on said tire; and, means for sensing and controlling at least one of said means for centering, said means for cutting and said means for pulling, in response to said means for sensing and stopping said tire.

2. The apparatus of claim 1, wherein said means for conveying comprises:

an indexing conveyor including two separate conveyor belts which lie in said plane and are equidistant from said line and spaced from each other sufficient for enabling said means for debeading to pass through the open center of said tire after it has been centered by said means for centering.

3. The apparatus of claim 2, wherein said means for centering comprises:

means for pushing said tire to a centered position on said conveyor after said tire reaches said predetermined point; said means for pushing having a pushing end and being positioned on a side of said conveyor and lying in a substantially straight line perpendicular to, and passing through said path of said tire, wherein said pushing end is pointed toward said tire.

4. The apparatus of claim 3, wherein:

said means for sensing and stopping comprises an electric eye having a beam substantially perpendicular to said conveyor and lying in the path of said tire, and a switch for stopping power to said Conveyor in response to the disruption of said beam by said tire; and said means for pushing comprises two push arms each including a servo motor.

5. The apparatus of claim 4 wherein:

said means for cutting comprises a circular saw; and, said means for pulling comprises a die and a hook for pulling said bead through said die, after said at least one bead has been cut by said circular saw.

6. The apparatus of claim 4, wherein said means for sensing and controlling comprises:

means for activating both servo motors in response to stopping said tire, for driving each of said two push arms from an initial position to an extended position and for resetting each servo motor after said at least one bead is pulled from said tire;

means for positioning said means for cutting from an initial position to a bead cutting position;

means for causing said means for cutting to cut said at least one bead;

means for resetting said means for cutting after said at least one bead has been pulled from said tire; and means for repositioning said means for pulling and for enabling engagement of said at least one bead by said means for pulling.

7. The apparatus of claim 1, wherein said means for sensing and controlling comprises a microprocessor.

8. The apparatus of claim 1, wherein said means for pulling said bead is positioned at an angle of about one hundred and eighty degrees relative to said first position of said tire.

9. The apparatus of claim 1, wherein said means for debeading is located below said plane and centrally positioned about a line which passes through said predetermined point and is generally perpendicular to said plane.

10. A method for removing at least one bead from a tire, comprising the steps of:

conveying said tire along a generally horizontal plane to a predetermined point lying on a generally straight path lying on said plane;

sensing and stopping said tire when its center coincides with said predetermined point relative to the longitudinal dimension of said path;

centering said tire about said predetermined point;

debeading said tire, said debeading including the steps of cutting and pulling said bead from below said plane and centrally about a line which passes through said predetermined point and said plane and which is generally perpendicular to said plane, further comprising:

positioning said tire at a bead cutting position;

cutting said at least one bead on said tire;

positioning said tire at a bead pulling position;

pulling said bead from said tire;

conveying said tire after removal of said bead sufficiently past said predetermined point to enable another tire to be debeaded.

11. The method of claim 10, wherein said second position on said tire is located at an angle of about one hundred and eighty degrees relative to said first position on said tire.

12. A method for removing at least one bead from a tire, comprising:

conveying said tire along a generally horizontal plane to a predetermined point lying on a generally straight path lying on said plane;

sensing and stopping said tire when its center about coincides with said predetermined point relative to the longitudinal dimension of said path;

centering said tire about a line which passes through said point and is substantially perpendicular to said plane;

debeading said tire located at about said point, said debeading comprising:

cutting said at least one bead at a first position on said tire, and pulling said at least one bead from said tire at a second position on said tire positioned at an angle of about one hundred and eighty degrees relative to said first position on said tire.

* * * * *